US009129458B2

(12) United States Patent
Geldmacher

(10) Patent No.: US 9,129,458 B2
(45) Date of Patent: Sep. 8, 2015

(54) MOBILE DEVICE

(75) Inventor: Alexander Geldmacher, Wuppertal (DE)

(73) Assignee: HUF HUELSBECK & FUERST GMBH & CO. KG, Velbert (DE)

( * ) Notice: Subject to any disclaimer, the term of this patent is extended or adjusted under 35 U.S.C. 154(b) by 401 days.

(21) Appl. No.: 12/950,479

(22) Filed: Nov. 19, 2010

(65) Prior Publication Data

US 2011/0121942 A1 May 26, 2011

(30) Foreign Application Priority Data

Nov. 25, 2009 (DE) ......................... 10 2009 047 148

(51) Int. Cl.

*G05B 23/00* (2006.01)
*G07C 9/00* (2006.01)
*H01H 9/02* (2006.01)
*H01H 13/06* (2006.01)
*H01H 13/86* (2006.01)
*G05G 1/02* (2006.01)
*H01H 11/00* (2006.01)

(52) U.S. Cl.

CPC .............. *G07C 9/00944* (2013.01); *G05G 1/02* (2013.01); *H01H 9/0235* (2013.01); *H01H 13/06* (2013.01); *H01H 13/86* (2013.01); *G07C 2009/00952* (2013.01); *H01H 2011/0081* (2013.01); *Y10T 70/7136* (2015.04)

(58) Field of Classification Search

USPC .......... 340/5.6–5.64, 426.13, 426.17, 426.35, 340/426.36, 572.8; 200/314, 341; 70/256–257

See application file for complete search history.

(56) References Cited

U.S. PATENT DOCUMENTS

2004/0069658 A1* 4/2004 Jeschke ........................ 206/37.1
2006/0144683 A1* 7/2006 White et al. .................. 200/341
2006/0166711 A1* 7/2006 Schworm .................. 455/575.1
2006/0202967 A1* 9/2006 Skillman et al. .............. 345/168
2007/0295588 A1* 12/2007 Kamata ......................... 200/341
2008/0073190 A1* 3/2008 Cove ............................ 200/314
2009/0314128 A1* 12/2009 Rick ............................... 74/558

(Continued)

FOREIGN PATENT DOCUMENTS

CN 1505805 A 6/2004
DE 19915969 A 11/1999

(Continued)

OTHER PUBLICATIONS

European Search Report dated Mar. 16, 2011 from corresponding European Patent Application No. 10 19 1805-2 pages.

(Continued)

*Primary Examiner* — Ojiako Nwugo

(74) *Attorney, Agent, or Firm* — Maier & Maier, PLLC

(57) ABSTRACT

The invention relates to a mobile device for activating an electrical component (50), especially a switch (50), which is arranged inside a housing (10), with a recess (13) provided on the housing (10), at least one elastic key element (31) accessible from the outside, which is accommodated in the recess (13), and the key element (31) has a contact means (32), wherein the contact means (32) is pointing toward the interior of the housing (10), in order to activate the electrical component (50), and a carrier (35) which holds the key element (31) on the housing (10). According to the invention, the carrier (35) and the key element (31) are made of different materials and form a common assembly unit (30) that is fastened to the housing (10).

14 Claims, 3 Drawing Sheets

(56) References Cited

U.S. PATENT DOCUMENTS

Figure 1:
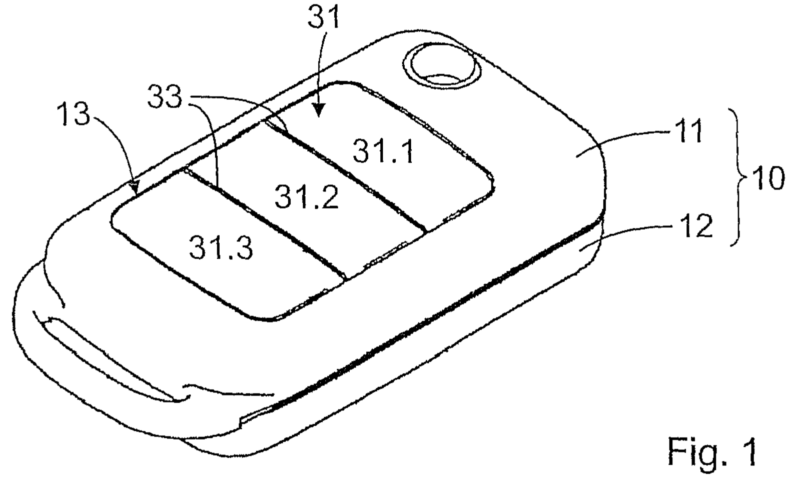

| | | | | |
|---|---|---|---|---|
| 2011/0154621 | A1* | 6/2011 | Ehrhardt et al. | 24/289 |
| 2011/0241847 | A1* | 10/2011 | Baruco et al. | 340/12.5 |

FOREIGN PATENT DOCUMENTS

| | | | |
|---|---|---|---|
| DE | 19964166 | C1 | 8/2001 |
| DE | 10121045 | A1 | 11/2002 |
| DE | 102005014563 | A1 | 9/2006 |
| WO | 9955990 | A1 | 11/1999 |
| WO | 2009109875 | A1 | 9/2009 |

OTHER PUBLICATIONS

German Search Report dated Nov. 17, 2010 from corresponding German Patent Application No. 10 2009 047 148.0-4 pages.
CN 201010560055.X Office Action issued Dec. 30, 2013.

* cited by examiner

MOBILE DEVICE

RELATED APPLICATIONS

This application claims priority, under 35 U.S.C. §119, to German Patent Application No. DE 10 2009 047 148.0, filed on Nov. 25, 2009, the disclosure of which is incorporated by reference herein in its entirety.

The invention relates to a mobile device for activating an electrical component, especially a switch, which is arranged inside a housing, with a recess provided on the housing, at least one elastic key element accessible from the outside, which is accommodated in the recess, and the key element has a contact means, wherein the contact means is pointing toward the interior of the housing, in order to activate the electrical component, and a carrier which holds the key element on the housing.

In DE 101 21 045 C2 there is disclosed a housing for an electronic key, which has electrical and electronic parts inside the housing. The housing is designed with a through opening, which can be covered by an electrical key pad with a key, the key being provided with an extension by which a switch inside the housing can be activated. The key pad is fastened to a carrier for mounting on the housing. The carrier here serves as a fastening means for the key pad. During the assembly of this key housing, the key element first needs to be fastened to the carrier before the key pad can be mounted on the housing.

The problem of the invention is to create a device of the aforesaid kind, whose assembly expense can be reduced.

This problem is solved according to the invention by all the features of claim 1. The dependent patent claims specify possible embodiments.

The special benefit of this invention is that the assembly of the key element on the carrier no longer has to be done manually by a worker, since the two parts form a common assembly unit that can be fastened onto the housing in simple fashion. Thus, the number of parts of the mobile device can be reduced, while the carrier ensures a reliable fastening of the key element on the housing. The key element, on the other hand, is made to be elastic in its material properties, so as to absorb a pressing force acting from the outside, while at the same time the contact means is elastically deformed accordingly and this brings about an activation of the electrical and/or electronic component.

Advantageously, the assembly unit can be fastened to the housing in positive or non-positive fashion. In one possible embodiment of the invention, the carrier and the key element form a 2-piece injected molded part.

It is conceivable for the carrier to have at least one detent element, which also extends though a hole in the recess of the housing, and there is a clip connection between the detent element and housing. The detent element can be elastically deformable, so that when mounting the assembly unit on the housing the detent element is elastically deformed from its position of rest and abuts directly against the housing in the installed state of the assembly unit, with the detent element engaging behind a wall of the housing. This brings about a reliable fastening thanks to this described clip connection of the assembly unit on the housing. The detent element is advantageously fashioned as a hook at its end region, which ensures a reliable purchase of the assembly unit on the housing.

In one preferred embodiment of the invention, the key element can be fashioned as a key pad with a plurality of keys, each key having a contact means that is located inside an opening of the recess of the housing and extending in the direction of the electrical component. By activating the keys, various functions can be achieved by a corresponding activating of the electrical component via the contact means. Each contact means can be associated with its own electrical component. The keys preferably form a common structural part, which forms the key pad. Advantageously, the housing is configured in the region of the recess with the opening so that when the key element is activated, the contact means can move reliably inside the opening in the direction of the electrical component, so that the activating of the electrical component can be triggered.

In one possible embodiment of the invented mobile device, the housing can have a top and a bottom part, the assembly unit being fastened to the top part. The top and the bottom part can be joined together in positive and/or non-positive manner. Inside the housing there is an inner space that is closed off by the top and bottom parts. Inside this inner space, the electrical component can be provided on a board, for example. The board can be provided with yet other, not more specifically described electrical and/or electronic components.

Advantageously, the key element is elastically configured so that after a corresponding activation of the electrical component by the contact means the key element is elastically deformed back to its original position if no further force is exerted on the key element from the outside.

The individual keys of the key pad can be separated from each other by corresponding haptic means. These haptic means can be configured as a rib, for example, or as a groove-like depression between the respective keys.

Advantageously, the housing can have means of sealing off the interior of the housing in the region of the recess. It is conceivable that the means will extend as a projection in the direction of the key element and penetrate into the key element by its free end. Thus, a reliable sealing can be obtained between the housing and the assembly unit, especially the key element. In one conceivable embodiment of the invention, the means can be configured pointlike and encircles the opening for the contact means and the hole for the detent element. When the assembly unit is mounted on the housing, the key element will be deformed in the region of the pointlike means, while at the same time the pointlike means will protrude into the key element. At the same time, the clip connection between the detent element and the housing ensures that the key element is held reliably and with a defined force on the pointlike means. At the same time, the pointlike sealing means thanks to its extending around the opening and the hole in the housing produces a reliable sealing off of the inner space of the housing.

Furthermore, it can be provided that the contact means is arranged inside the opening of the housing such that a free space exists between the contact means and the housing, so that the contact element is oriented in the region of the opening at a distance from the housing. If a corresponding pressing force is exerted on the key element, the key element with its contact means will move inside the opening in the direction of the electrical component. It is advantageous in this case for the free space between the contact means and the housing to get smaller during a corresponding activation of the electrical component. Thus, the free space offers the contact means sufficient freedom of movement. It is likewise conceivable that, when the electrical component is activated, the contact means comes to rest against the housing and therefore no more free space exists when a key element is activated. In both cases described, the free space that exists when the key element is not activated provides the user with a good haptic behavior of the key element.

In one special embodiment of the invention, the carrier can consist of a first material and the key element of a second material, while the first material has a first plastic and the second material a second plastic, wherein the first plastic has a greater mechanical resistance than the second plastic. The second material can be a silicone, a thermoplastic polymer, especially a material made of TPE or, for example, TPU.

Advantageously, the key element has a protective lacquer on its exterior. This protective lacquer can provide protection against the weather, scratches, etc.

To achieve the fastest possible assembly and secure mounting, it is recommended to design the hole with a slanted sliding surface, and during the fastening of the assembly unit on the housing the detent element moves along the sliding surface and is elastically deformed. The detent element can likewise be designed with corresponding sliding surfaces that slide along the sliding surfaces of the hole in the housing. By applying a certain force during the fastening of the assembly unit to the housing, an elastic deformation of the detent element occurs, whereupon the detent element travels along the slanted sliding surface of the housing and becomes deformed. If the assembly unit is inserted deep enough into the seat of the housing, the detent element will snap back, engaging behind a wall of the housing and bringing about a reliable fastening of the assembly unit to the housing.

In one advantageous embodiment of the invention, the device is an ID transmitter for a keyless activation of a lock of a motor vehicle.

Figure 2:
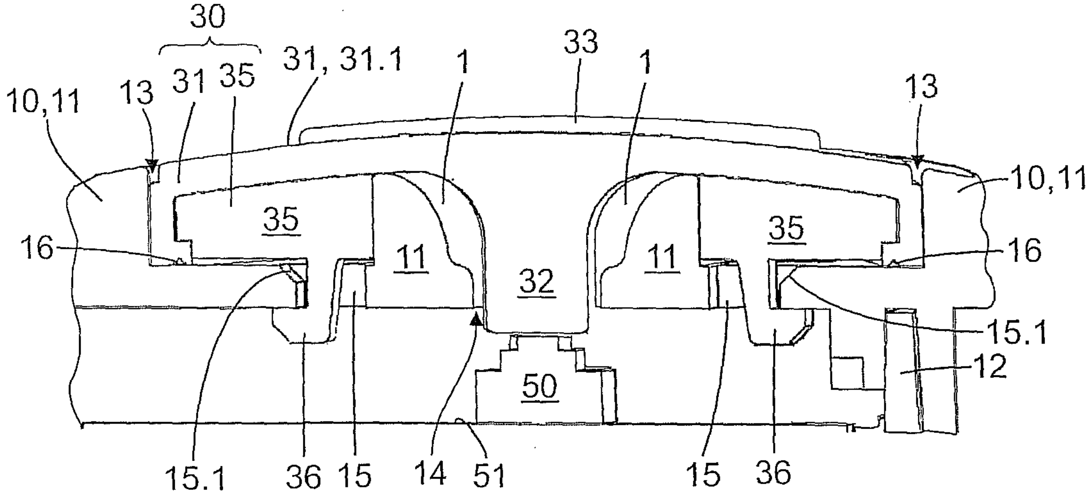
Figure 3:
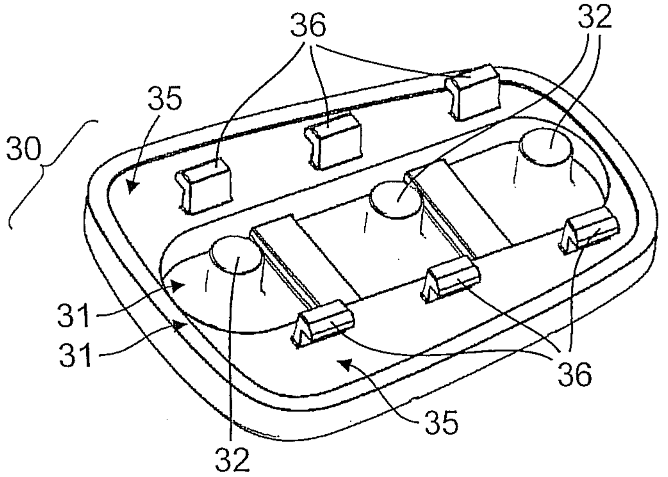
Figure 4:
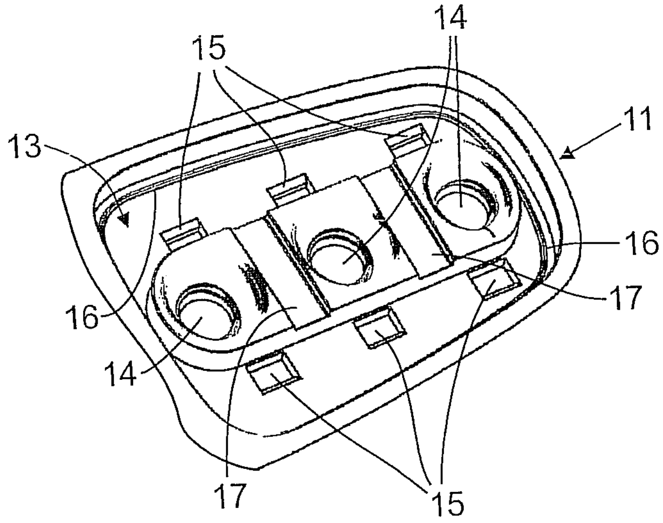
Figure 5:
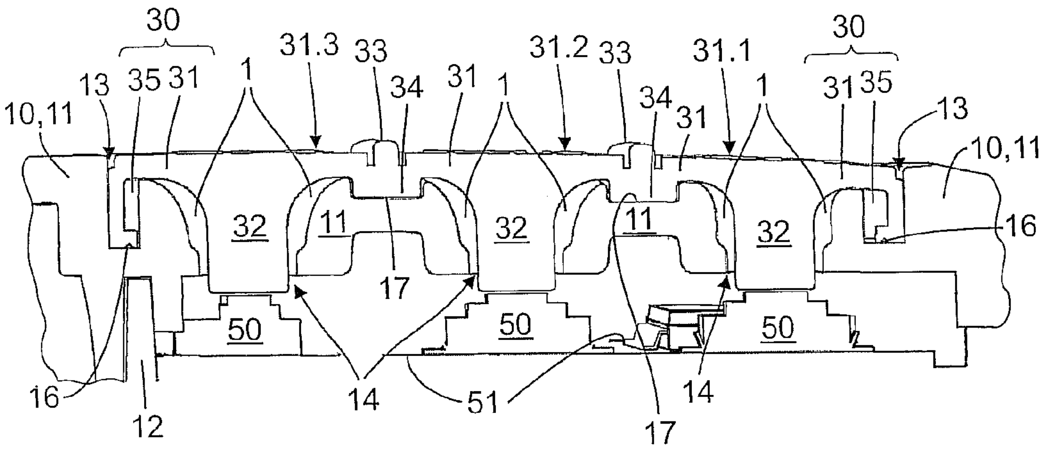

Further benefits, features and details of the invention will emerge from the following description. Making reference to the drawings, a sample embodiment will be described in detail. The features mentioned in the claims and the specification are essential to the invention, either in themselves or in any given combination. There are shown:

FIG. 1 a three-dimensional side view of a mobile device, where a key element, designed as a key pad, is inserted inside a housing, FIG. 2 a first sectional view along the key element of FIG. 1, FIG. 3 a three-dimensional side view of the key element, which forms with a carrier a common assembly unit, FIG. 4 a view of part of the housing of FIG. 1 and FIG. 3, FIG. 5 a second sectional view along the key element of FIG. 1.

In the sample embodiment depicted in FIG. 1 to FIG. 5, a mobile device is shown, being an ID transmitter for a keyless activation of a locking device of a motor vehicle. The mobile device has a housing 10, which comprises a top part 11 and a bottom part 12. Inside the housing 10 there is arranged an electrical and/or electronic component, which can be activated by a key element 31, inserted in the housing 10. The elastic key element 31 in the present sample embodiment is designed as a key pad with three keys 31.1, 31.2, 31.3. The key element 31 in the present sample embodiment is inserted in a recess 13 of the housing 10, shown in FIG. 2 and FIG. 3.

Each key 31.1, 31.2, 31.3 of the key element 31 has a contact means 32. The contact means 32 has the form of a plunger 32. The plunger 32 is formed of the same material on the key element 31. The contact means 32 serves to operate and activate the component 50, which is fastened to a board 51 inside the housing 10, see FIG. 4 and FIG. 5.

As can be seen in FIG. 2, the contact means 32 is oriented toward the inside of the housing 10, and when the key element 31 is not activated the contact means 31 is at a distance from the component 50. When the key element 31, especially a key 31.1, 31.2, 31.3, is activated, there occurs an elastic deformation of the key element 31, whereupon the contact means 32 makes contact with the component 50. In this way, for example, a signal can be triggered to lock and/or unlock a locking device of a motor vehicle. It is likewise conceivable that the activating of the component 50 will trigger an opening of the trunk or other actions on the motor vehicle. The mobile device is in data communication with the motor vehicle in this case, especially with a control unit arranged inside the motor vehicle. By an appropriate activating of the key element 31, various signals are relayed to the motor vehicle, for example, by sending and/or receiving units that are arranged both on the mobile device and on the motor vehicle.

As is clearly seen in FIG. 2, a carrier 35 is provided, which reliably holds the key element 31 on the housing 50. The carrier 35 forms with the key element 31 a common assembly unit 30, which is made clear in FIG. 3. The carrier 35 in this case is made of different material than the key element 31. According to the sample embodiment shown, the carrier 35 consists of a first material and the key element 31 of a second material. The first material has a first plastic and the second material a second plastic, with the first plastic having a greater mechanical resistance than the second plastic. This means that the key element 31 is more easily elastically deformable than the carrier 35, which provides for a reliable fastening of the assembly unit 30 in the recess 13 on the top part 11 of the housing 10.

According to the present sample embodiment, the second material is a silicone. It is also conceivable to have the second material be a thermoplastic polymer that is used for the key element 31.

The carrier 35 is designed with detent elements 36, each of which extends through a hole 15 in the recess 13 of the housing 10. The hooklike detent element 36 engages behind the top part 11 and lies directly against the wall of the top part 11, so that a clip connection is formed between the detent element 36 and the housing 10. As shown in FIG. 3 and FIG. 4, each key 31.1, 31.2, 31.3 is coordinated with a contact means 32, an opening 14 and two holes 15, with one detent element 36 reaching through each hole 15.

The top part 11 of the housing 10, on which the assembly unit 30, especially the carrier 35 with the key element 31 is installed, is shown in FIG. 4. Here, the top part 11 has three openings 14, one for each contact means 32 of the key element 31. The six holes 15 are provided one for each detent element 36.

According to the sample embodiment shown, the assembly unit 30 with the carrier 35 and the key element 31 is a 2-component injection molded part, which is set as the assembly unit 30 into the top part 11, with the carrier 35 introduced into the recess 13. During this assembly process, each detent element 36 slides on a slanted sliding surface 15.1 of the hole 15, whereupon the detent element 36 moves along the sliding surface 15.1 and is elastically deformed. Finally, the free end of the detent element 36 exits from the opening 15, whereupon the detent element 36 is elastically deformed back and takes up the position shown in FIG. 2.

As illustrated in FIG. 2 and FIG. 4, the housing 10 has means 16 of sealing off the interior of the housing 10 in the region of the recess 13. In the present sample embodiment, the means 16 extends as a projection in the direction of the key element 31 and its free end penetrates into the key element 31. In this region, the material of the key element 31 is compressed. Thus, a reliable sealing of the inner space of the housing 10 can occur. As is illustrated in FIG. 4, the pointlike means 16, having the shape of a collar, encircles the holes 15 as well as the openings 14.

In order to achieve a satisfactory haptic behavior of all the keys 31.1, 31.2, 31.3, the contact means 32 of each key 31.1, 31.2, 31.3 is arranged inside the opening 14 of the housing 10 so that a free space 1 exists between the contact means 32 and the top part 11, so that the contact means 32 when the key element 31 is not activated is oriented in the opening 14 at a distance from the top part 11.

In the present sample embodiment, the key element 31 is designed with a protective lacquer on its surface, which protects the key element 31 from environmental factors such as moisture or scratching, etc. Furthermore, the material of the key element 31 is designed such that, after activating the key element 31, the key element 31 is elastically deformed back to its original position, so that the contact means 32 is again at a distance from the respective component 50. In the present sample embodiment, the component 50 is a switch. As shown in FIG. 5, three switches 50 are provided for the three contact means 32 belonging to each key 31.1, 31.2, 31.3. The individual keys 31.1, 31.2, 31.3 are separated from each other by a projecting rib 33. This rib 33 serves to reinforce the key pad. Thanks to this reinforcement, the individual keys 31.1, 31.2, 31.3 can be clearly distinguished when initiating their switching movement. The provided rib 33 at the same time has the function of a touch ridge that can be haptically sensed by the user.

The space lying beneath the board 51 in FIGS. 2 and 6 can be used, for example, to accommodate other electrical and/or electronic components or the battery itself.

A reliable holding of the assembly unit 30 on the top part 11 is improved in that a depression 17 is provided between every two openings 14 (see FIGS. 4 and 5), and a projection 34 formed on each key element 31 is accommodated in the depression 17. The projection 34 in this case is adapted to the shape of the depressions 17 and is held in the depression 17 in positive and/or non-positive fashion. Each projection 34 is located underneath the rib 33. At the same time, the ridgelike depression 17 serves as a bearing for the key element 31, thereby ensuring a good haptic behavior for the user.

LIST OF REFERENCE NUMBERS

1 free space
10 housing
11 top part
12 bottom part
13 recess
14 opening
15 hole
15.1 sliding surface
16 means
17 depression
30 assembly unit
31 key element
31.1 key
31.2 key
31.3 key
32 contact means, plunger
33 rib
34 projection
35 carrier
36 detent element
50 electrical component, switch
51 board

The invention claimed is:

1. A mobile device for activating an electrical component which is arranged inside a housing, comprising:

a recess provided on the housing, at least one elastic key element accessible from the outside, which is accommodated in the recess, and the key element has a contact means, wherein the contact means is pointing toward the interior of the housing, to activate the electrical component, and a carrier fastened directly to the housing, which holds the key element on the housing, wherein the carrier and the key element are made of different materials and form a common assembly unit that is fastened to the housing, wherein the carrier and the key element form a 2-piece injected molded part, wherein the carrier further comprises a first material and the key element of a second material, while the first material has a first plastic and the second material a second plastic, wherein the first plastic has a greater mechanical resistance than the second plastic.

2. A mobile device according to claim 1, wherein the assembly unit is fastened to the housing in positive or non-positive fashion.

3. A mobile device according to claim 1, wherein the carrier has at least one detent element, which also extends through a hole in the recess of the housing, and there is a clip connection between the detent element and housing.

4. A mobile device according to claim 1, wherein the key element is fashioned as a key pad with a plurality of keys, each key having a contact means that is located inside an opening of the recess of the housing and extending in the direction of the electrical component.

5. A mobile device according to claim 1, wherein the housing has a top part and a bottom part, the assembly unit being fastened to the top part.

6. A mobile device according to claim 1, wherein the housing has a means of sealing off the interior of the housing in the region of the recess.

7. A mobile device according to claim 6, wherein the means extends as a projection in the direction of the key element and penetrates into the key element by its free end.

8. A mobile device according to claim 6, wherein the means is configured pointlike and encircles an opening of the recess of the housing and a hole in the recess of the housing.

9. A mobile device according to claim 6, wherein the contact means is arranged inside the opening of the housing such that a free space exists between the contact means and the housing, so that the contact means is oriented at a distance from the housing.

10. A mobile device according to claim 1, wherein the second material is a silicone or a thermoplastic polymer.

11. A mobile device according to claim 1, wherein the key element has a protective lacquer on its exterior.

12. A mobile device according to claim 1, wherein a hole in the recess of the housing is designed with a slanted sliding surface, and during the fastening of the assembly unit to the housing, the detent element travels along the sliding surface and becomes elastically deformed.

13. A mobile device according to claim 1, wherein the device is an ID transmitter for a keyless activation of a lock of a motor vehicle.

14. A mobile device according to claim 1, wherein the housing has a top part and a bottom part, and the assembly unit being fastened to the top part of the housing, and the contact means is arranged inside the opening of the housing such that a free space exists between the contact means and the top part, so that the contact means is oriented at a distance from the top part when the key element is not activated, and wherein the contact means comes to rest against the top part when the electrical component is activated.

* * * * *